United States Patent
Yokoi

(10) Patent No.: US 7,426,166 B2
(45) Date of Patent: Sep. 16, 2008

(54) INFORMATION RECORDING METHOD AND INFORMATION RECORDING APPARATUS THAT CAN ACHIEVE UNIFORM SIGNAL CHARACTERISTICS AND OVERWRITING CHARACTERISTICS OVER AN ENTIRE SURFACE OF AN OPTICAL DISK MEDIUM

(75) Inventor: Kenya Yokoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 10/875,167

(22) Filed: Jun. 25, 2004

(65) Prior Publication Data

US 2005/0013229 A1    Jan. 20, 2005

(30) Foreign Application Priority Data

Jul. 15, 2003    (JP)    ............................. 2003-196865

(51) Int. Cl.
  *G11B 5/09*    (2006.01)
(52) U.S. Cl. .................. 369/59.11; 369/59.12; 369/116; 369/47.5
(58) Field of Classification Search ........................ None
  See application file for complete search history.

(56) References Cited

U.S. PATENT DOCUMENTS

| | | | |
|---|---|---|---|
| 4,984,873 A | 1/1991 | Takiguchi et al. | |
| 5,056,896 A | 10/1991 | Iimura et al. | |
| 5,732,062 A | 3/1998 | Yokoi et al. | |
| 6,426,929 B1 | 7/2002 | Watabe et al. | |
| 6,459,666 B1 | 10/2002 | Yokoi | |
| 6,487,149 B1 | 11/2002 | Yokoi et al. | |
| 6,600,712 B1 | 7/2003 | Masui et al. | |
| 6,664,526 B2 | 12/2003 | Yokoi | |
| 6,801,240 B2 * | 10/2004 | Abe et al. | ............ 347/252 |
| 2002/0071380 A1 | 6/2002 | Shimizu et al. | |
| 2002/0105875 A1 | 8/2002 | Ushiyama et al. | |
| 2002/0196324 A1 | 12/2002 | Abe et al. | |
| 2003/0090981 A1 | 5/2003 | Yokoi | |
| 2003/0156519 A1 | 8/2003 | Yokoi | |
| 2003/0189885 A1 | 10/2003 | Masui et al. | |
| 2004/0011945 A1 | 1/2004 | Yokoi | |

FOREIGN PATENT DOCUMENTS

| | | |
|---|---|---|
| EP | 1 249 834 A2 | 10/2002 |
| EP | 1 298 650 A2 | 4/2003 |
| JP | 5-225570 | 9/1993 |
| JP | 5-274678 | 10/1993 |
| JP | 2707774 | 10/1997 |
| JP | 10-106008 | 4/1998 |
| JP | 2001-118245 | 4/2001 |
| JP | 2001-243626 | 9/2001 |
| JP | 2003-157536 | 5/2003 |
| WO | WO 01/86642 A1 | 11/2001 |

* cited by examiner

*Primary Examiner*—Thang V. Tran
*Assistant Examiner*—Joseph Haley
(74) *Attorney, Agent, or Firm*—Dickstein Shapiro LLP

(57) ABSTRACT

In an information recording method and apparatus, when performing recording by using multiple pulses defined by erase powers Pe1 and Pe2 for forming a space part between mark parts, the set values of the erase powers Pe1 and Pe2 are updated at predetermined intervals in accordance with a recording linear velocity.

7 Claims, 10 Drawing Sheets

LINEAR DENSITY

NUMBER OF REVOLUTIONS

CHANNEL CLOCK FREQUENCY

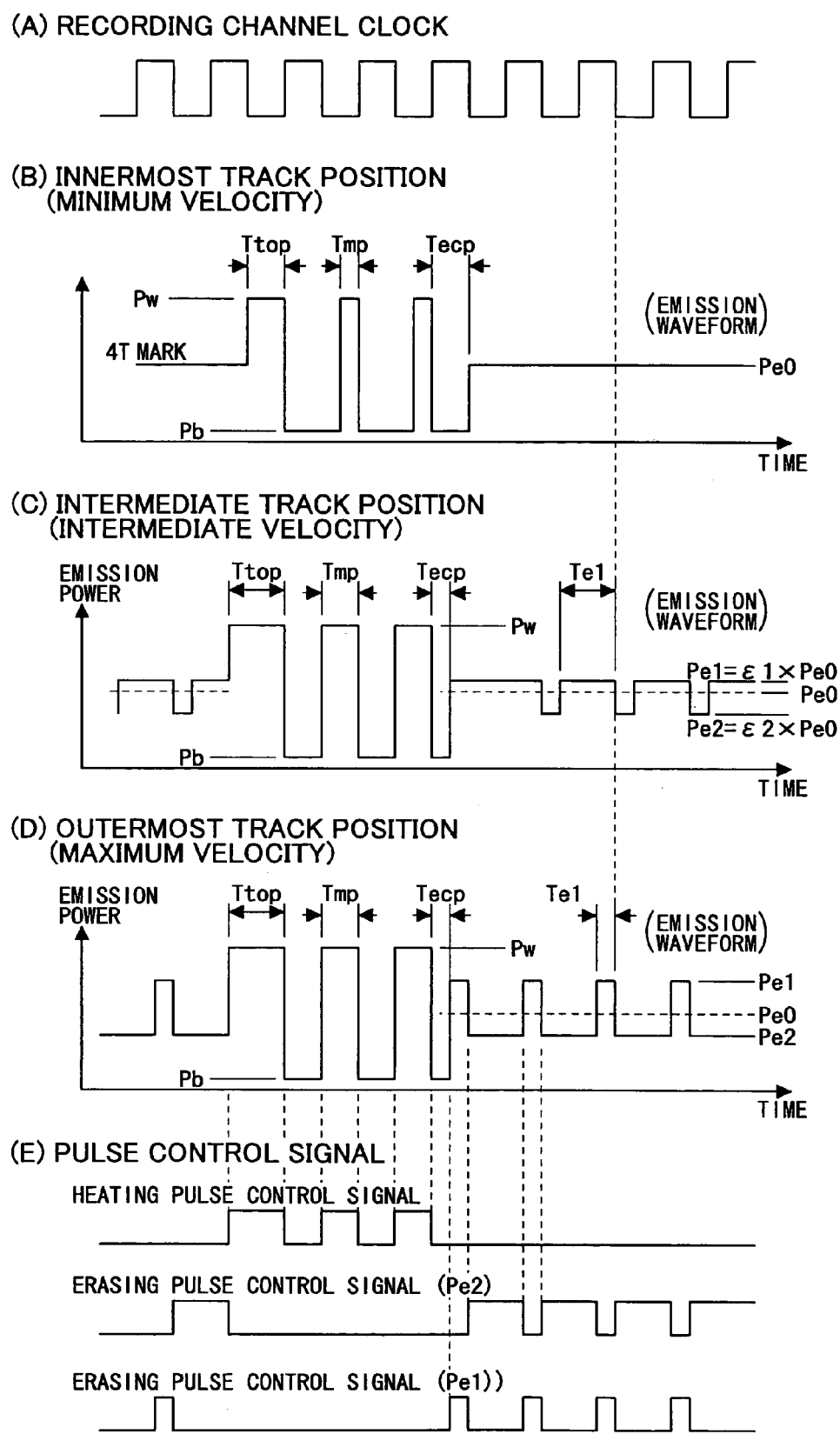

INFORMATION RECORDING METHOD AND INFORMATION RECORDING APPARATUS THAT CAN ACHIEVE UNIFORM SIGNAL CHARACTERISTICS AND OVERWRITING CHARACTERISTICS OVER AN ENTIRE SURFACE OF AN OPTICAL DISK MEDIUM

BACKGROUND OF THE INVENTION

1. Field of the Invention

The present invention generally relates to information recording methods and information recording apparatuses for phase change optical disks such as DVD-RWs (ReWritable), which include a recording layer whose phase is reversibly changed between a crystal phase and an amorphous phase and are compatible with the formats of, for example, DVD-Videos (Digital Videos or Digital Versatile Discs) and playback-only DVDs such as DVD-ROMs.

2. Description of the Related Art

With the penetration of multi-media, various information recording disks have been developed: examples include playback-only disks such as DVD-Videos and DVD-ROMs, recordable DVD-Rs using an organic dye material for a recording layer, and rewritable DVD-RWs using a phase change material for a recording layer.

Information (sectors, in this example) recorded on such DVDs is in the format shown in FIG. 1A. In such a format, data (sectors) are continuously recorded on the entire track of a disk at a constant linear density as shown in FIG. 1B.

In order to achieve an information recording medium having compatibility with playback-only disks, information is recorded with a constant recording channel clock frequency as shown in FIG. 1D while constantly maintaining the linear velocity in the track by controlling the rotational speed of the disk such that the number of revolutions becomes inversely proportional to the track radius by using a CLV (Constant Linear Velocity) method as a method for controlling the rotational speed of the information recording medium (disk) as shown in FIG. 1C.

However, in order to control the rotational speed by the CLV method, it is necessary to vary the rotational speed of a disk such that the linear velocity in the track becomes constant. That is, a great running torque and a large and high-cost motor are required since the speed of a spindle motor for rotating the disk needs to be varied. In addition, there is a disadvantage in that, at the time of seeking, a longer access time is required compared to that of an HDD or a MO drive, since a waiting time period is required until completion of speed variation of the spindle motor.

In order to perform recording on a disk while maintaining a constant rotational speed of the disk without performing speed variation control, it has also been conceived to make the format of information recorded on a disk as shown in FIGS. 2A through 2D. That is, as shown in FIG. 2D, the frequency of a channel clock used in recording of the disk is decreased in the inner tracks and increased in the outer tracks such that the frequency is proportional to the radius position of the track. In this case, since the recording linear velocity becomes small in the inner tracks and large in the outer tracks, the recording linear density is constant as shown in FIG. 2B. In addition, it is possible to record information on the disk while maintaining a constant number of revolutions (rotational speed) of the disk as shown in FIG. 2C, i.e., by using a CAV (Constant Angular Velocity) method.

Accordingly, it becomes unnecessary to perform rotational speed variation control of the spindle motor that rotates the disk. Thus, low-revolution torque will suffice and it is possible to use a small and low-cost motor. Further, since speed variation is not performed, the waiting time period at the time of seeking is eliminated. Consequently, it is possible to significantly reduce the access time period.

Additionally, it is also possible to use a ZCLV method in which an optical disk medium is divided into a plurality of regions (zones) in the radial direction thereof, and the recording speed for each of the zones is varied such that the average number of revolutions (angular velocity) of the disk over the zones becomes constant while maintaining a constant recording linear velocity in each of the zones by using the above-mentioned CLV method.

However, generally, in a phase change optical disk medium, the ratio among the pulse width of a recording pulse sequence, heating power, and erase power of a laser emission during recording at a specific recording linear velocity is optimized, and the states of marks and spaces formed vary at a different recording linear velocity. In other words, the heat capacity of a top heating pulse, which is necessary for formation of a mark, may be excessive or deficient, the average length of marks may be different due to variation in cooling rate, and faulty erasing and degradation of a recording film may occur due to excessive or deficient erase power. Hence, jitter may be degraded or the number of times of overwriting may be decreased.

In this regard, according to Japanese Laid-Open Patent Application No. 5-22570, in order to obtain in a relatively short time period an optimum recording light volume corresponding to the entire recordable regions of each optical disk, the optimum light volume is obtained at the same recording linear velocity for each of at least two positions in a test-writing region. Then, by performing interpolation or extrapolation with respect to the optimum recording light volumes at the two recording linear velocities obtained by an interpolating routine, the optimum recording light volumes are obtained for all of the recording linear velocities.

In addition, according to Japanese Laid-Open Patent Application No. 5-274678, in order to reduce the laser power required for recording without degrading jitter characteristics, in a method of recording information in the outer track regions at frequencies higher than those for the inner track regions by emitting an optical beam whose intensity is modulated in accordance with an information signal on the basis of a reference clock that is different for each region while rotating an optical disk at a constant number of revolutions, the optical beam is periodically emitted at a frequency that is an integral multiple of the frequency of the reference clock for each region. Additionally, when the optical beam is emitted on the outer track regions, the duty ratio of pulse emission is set larger than that in the time when the optical beam is emitted on the inner track regions.

Further, according to Japanese Laid-Open Patent Application No. 10-106008, in order to provide an optical disk apparatus capable of high-speed and highly-reliable recording, an optical disk, an optical head, synchronization signal generating means, a VCO, phase comparing means, a controller, and recording signal generating means are provided, and the height and width of a pulse of a recording signal is varied in accordance with the recording linear velocity, such that recording can be consistently performed under the best recording conditions.

Additionally, Japanese Laid-Open Patent Application No. 2001-118245 discloses a method in which, among a top heating pulse duty ratio Ttop for varying the front edge of the top heating pulse in a recording pulse sequence, an end-off cooling pulse duty ratio Tecp for varying the rear edge of the end-off cooling pulse in the recording pulse sequence, and an erase power ratio E that is the ratio of an erase power Pe with respect to a heating power Pw, at least two of the above-mentioned set values are updated at predetermined intervals. Thereby, even if the recording linear velocity is varied by CAV control that makes the number of revolutions of a disk constant, recording is performed in which uniform characteristics are obtained over the entire surface of a phase change optical disk medium.

However, generally, it is difficult for a phase change optical disk to correspond to a wide-range recording linear velocity. Particularly, in a case where recording is performed at a high recording linear velocity, it is necessary to adjust the length of a recording mark by lowering the level of erase power. Thus, there is a problem in that erase power sufficient for overwriting cannot be supplied.

In this regard, according to Japanese Patent Publication No. 02707774, it is disclosed that overwriting characteristics at a high recording speed are improved by composing an erasing pulse part by multiple pulses, thereby achieving the erasing level of high erase power and reduction of the average power by using low erase power. However, in a recording state where the recording linear velocity is not constant as in CAV recording, it is difficult to perform recording in which uniform signal characteristics are obtained over the entire surface of a disk and a decrease in the number of times of overwriting is prevented.

That is, in the above-mentioned patent documents, the set values of some elements of a recording pulse sequence, such as the duty ratio of pulse emission, are varied in accordance with the recording linear velocity as in the CAV method. However, merely qualitative effects with respect to an optical disk medium are obtained, which are not sufficient for recording disks, particularly, for DVDS.

In other words, since variation in overwriting characteristics, i.e., variation in characteristics of recording information (RF signal) such as a decrease in the number of times of overwriting, is not only affected by formation of a recording mark part but also by the light emission waveform of an erasing pulse part in an interacting manner, the recording methods disclosed in the above-mentioned patent documents are not sufficient, and it is not always possible to obtain uniform signal characteristics over the entire surface of an optical disk and to avoid a decrease in the number of times of overwriting. Thus, it is not always possible to obtain desired effects at a high recording linear velocity covering a wide range. Moreover, even if the set values of an erasing pulse part are to be varied, quantitative study has not been conducted with respect to how to vary the set values.

SUMMARY OF THE INVENTION

A general object of the present invention is to provide an improved and useful information recording method and information recording apparatus in which one or more of the above-mentioned problems are eliminated.

Another and more specific object of the present invention is to provide an information recording method and an information recording apparatus that can perform recording while achieving uniform signal characteristics over the entire surface of a phase change optical disk medium having a recording layer whose phase reversibly varies between a crystal phase and an amorphous phase, and that can avoid a decrease in the number of times of overwriting with good overwriting characteristics by using a simple method without performing speed variation control of the rotational speed of the optical disk at the time of recording of information while rotating the optical disk, and while maintaining compatibility with the recording formats of conventional playback-only optical disks.

A further object of the present invention is to provide an information recording method and an information recording apparatus that are effective in controlling the emitted light volume of a LD at the time of recording to be a constant value by means of a drive circuit.

In order to achieve one or more of the above-mentioned objects, according to one aspect of the present invention, there is provided an information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts, updating set values of the erase power Pe1 and the erase power Pe2 at predetermined intervals in accordance with the recording linear velocity.

Accordingly, even if the recording linear velocity is varied as in the CAV method and the erase condition of an optical disk medium varies, it is possible to constantly supply a sufficient erase power by using the erase power Pe1 in the multiple pulses without increasing the average erase power. Also, since the set values of the erase powers Pe1 and Pe2 are sequentially updated (set) at predetermined intervals in accordance with the recording linear velocity, it is possible to perform recording with good overwriting characteristics over an entire surface of the optical disk medium.

Additionally, according to another aspect of the present invention, there is provided an information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts, updating a set value of a duty ratio Te1 of a pulse width of the erase power Pe1 with respect to a cycle of the multiple pulses at predetermined intervals in accordance with the recording linear velocity.

Accordingly, even if the erase condition of an optical disk medium varies with a variation in the recording linear velocity as in the CAV method, an optimum duty ratio of the pulse width of the erase power is sequentially and constantly updated (set). Hence, it is possible to perform recording with good overwriting characteristics over an entire surface of the optical disk. Particularly, when varying the duty ratio of the pulse width of the erasing pulse, the edge position of the erasing pulse of the erase power Pe1 may be varied in accordance with the recording linear velocity. Thus, the control is easy and the process can be simplified.

Additionally, according to another aspect of the present invention, there is provided an information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density become substantially constant; and when performing recording by using multiple pulses defined by an erase power Pe1 and an erase power Pe2 as an erasing pulse for forming a space part between mark parts, updating set values of the erase power Pe1 and the erase power Pe2 and a set value of a duty ratio Te1 of a pulse width of the erase power Pe1 with respect to a cycle of the multiple pulses at predetermined intervals in accordance with the recording linear velocity.

Accordingly, even if the recording linear velocity is varied as in the CAV method and the erase condition of an optical disk medium varies, it is possible to constantly supply a sufficient erase power by using the erase power Pe1 in the multiple pulses without increasing the average erase power. Also, since the set values of the eraser powers Pe1 and Pe2 are sequentially updated (set) at predetermined intervals in accordance with the recording linear velocity, it is possible to perform recording with good overwriting characteristics over an entire surface of the optical disk medium. Particularly, when varying the duty ratio of the pulse width of the erasing pulse, the edge position of the erasing pulse of the erase power Pe1 may be varied in accordance with the recording linear velocity. Thus, the control is easy and the process can be simplified.

In an embodiment of the present invention, the step of updating may include the step of updating the set values of the erase power Pe1 and the erase power Pe2 at predetermined intervals in accordance with the recording linear velocity such that the difference between the erase power Pe1 and the erase power Pe2 is increased in accordance with an increase in the recording linear velocity.

In another embodiment of the present invention, the step of updating may include the step of updating set values of a coefficient $\epsilon 1$ and a coefficient $\epsilon 2$ at predetermined intervals in accordance with the recording linear velocity such that the difference between the coefficient $\epsilon 1$ and the coefficient $\epsilon 2$ is increased in accordance with an increase in the recording linear velocity, where, when an erase power Pe0 for a single erasing pulse is a target power, the erase power Pe1 is defined as Pe1=$\epsilon 1 \times$Pe0, and the erase power Pe2 is defined as Pe2=$\epsilon 2 \times$Pe0.

In a case where a recording linear velocity range that requires an erasing pulse divided into multiple pulses is to be covered, it is preferable to increase the erase power Pe1, which is the higher power and affects the overwriting characteristics, to a higher power in accordance with an increase in the recording linear velocity. Also, with respect to jitter characteristics, which are signal characteristics, it is preferable to reduce the erase power Pe2, which is the lower power, to a lower power in accordance with the increase in the recording linear velocity. However, by increasing the difference between the erase powers Pe1 and Pe2 in accordance with the increase in the recording linear velocity, it is possible to achieve both overwriting characteristics and jitter characteristics.

In an embodiment of the present invention, an information recording method may further include the step of updating a set value of a duty ratio Te1 of a pulse width of the erase power Pe1 at predetermined intervals in accordance with the recording linear velocity such that the duty ratio Te1 with respect to the cycle of the multiple pulses defined by the erase power Pe1 and the erase power Pe2, where Pe1>Pe2, is decreased in accordance with an increase in the recording linear velocity.

In a case where a recording linear velocity range that requires an erasing pulse divided into multiple pulses is to be covered, it is preferable to increase the erase power Pe1, which is the higher power and affects the overwriting characteristics, to a higher power in accordance with an increase in the recording linear velocity. Also, with respect to jitter characteristics, which are signal characteristics, it is preferable to reduce the erase power Pe2, which is the lower power, to a lower power in accordance with the increase in the recording linear velocity. However, by decreasing the duty ratio Te1 of the pulse width of the erase power Pe1 with respect to the cycle of the multiple pulses in accordance with the increase in the recording linear velocity, it is possible to achieve both overwriting characteristics and jitter characteristics.

In an embodiment of the present invention, the step of updating may include the steps of:

updating a set value of a duty ratio Te1 of a pulse width of the erase power Pe1 at predetermined intervals in accordance with the recording linear velocity;

detecting index values which are pre-formatted on the optical disk medium of a plurality of recording linear velocities, the erase powers Pe1 and the erase powers Pe2 corresponding to the recording linear velocities, and duty ratios Te1 of a pulse width of the erasing pulse corresponding to the recording linear velocities;

calculating variations in the set values of the erase power Pe1, the erase power Pe2, and the duty ratio Te1 that are updated at the predetermined intervals based on the detected index values; and setting the erase power Pe1 and the erase power Pe2 with respect to the desired recording linear velocity.

Accordingly, it is possible to determine the minimum intervals for updating the set values without calculating through test writing the initial values of the erase power values and the duty ratio of the pulse width of the erasing pulse formed by the multiple pulses. Also, it is possible to perform recording with uniform characteristics over an entire surface of the optical disk medium by a simple method.

In an embodiment of the present invention, the step of updating may include the step of reading one of:

updating a set value of a duty ratio Te1 of a pulse width of the erase power Pe1 at predetermined intervals in accordance with the recording linear velocity;

reading one of:

first optimum set values of: a plurality of recording linear velocities; the erase powers Pe1 and the erase powers Pe2 corresponding to the recording linear velocities; and duty ratios Te1 of the pulse width corresponding to the recording linear velocities, said first optimum set values being included in disk information previously recorded in a predetermined area of the optical disk medium in the past; and second optimum set values of: a plurality of recording linear velocities; the erase powers Pe1 and the erase powers Pe2 corresponding to the recording linear velocities; and duty ratios Te1 of the pulse width corresponding to the recording linear velocities, said second optimum set values being stored in an information recording apparatus beforehand, and setting the erase power Pe1 and the erase power Pe2 with respect to the recording linear velocity by calculating variations in the set values of: the erase power Pe1; the erase power Pe2; and the duty ratio Te1 of the pulse width, which are updated at the predetermined intervals, based on one of the first and second optimum set values that are read.

Accordingly, even in a case where recording or overwriting is performed on the optical disk medium, by using the optimum set values that are obtained from the optimum set values recorded in the previous time, it is possible to determine the minimum intervals for updating the set values without calculating again the erase power values and the duty ratio of the pulse width of the erasing pulse formed by the multiple pulses. Thus, it is possible to reduce the process time required until recording is started. Also, it is possible to perform recording with uniform characteristics over an entire surface of the optical disk by a simple method.

In an embodiment of the present invention, the step of updating may include the steps of:

updating a set value of a duty ratio Te1 of a pulse width of the erase power Pe1 at predetermined intervals in accordance with the recording linear velocity;

detecting address information that is pre-formatted on the optical disk medium;

calculating the set values of the erase power Pe1, the erase power Pe2, and a duty ratio Te1 of a pulse width of the erasing pulse with respect to the address information corresponding to the recording linear velocity from variations in the set values that are updated at predetermined intervals; and calculating the set values of the erase power Pe1, the erase power Pe2, and the duty ratio Te1 with respect to desired address information by associating the predetermined intervals with corresponding ranges of the address information.

Accordingly, even during recording, it is possible to easily and accurately determine the intervals for updating the set values such that the calculated optimum set values of an erasing pulse sequence formed by multiple pulses are not shifted. Thus, even if the recording linear velocity is varied and the erase condition of an optical disk medium varies as in the CAV method, it is possible to constantly update with a high degree of accuracy the optimum erase powers and the optimum duty ratio of the pulse width of the erasing pulse. Hence, it is possible to perform recording with good overwriting characteristics over an entire surface of the optical disk medium.

In an embodiment of the present invention, the step of updating may include the steps of:

updating a set value of a duty ratio Te1 of a pulse width of the erase power Pe1 at predetermined intervals in accordance with the recording linear velocity;

detecting one of index values or optimum set values of: a plurality of recording linear velocities; and the erase power Pe1, the erase power Pe2, and a duty ratio Te1 of a pulse width of the erasing pulse that are corresponding to the recording linear velocities; and calculating variations in the set values of the erase power Pe1, the erase power Pe2, and the duty ratio Te1 that are updated at the predetermined intervals by one of a linear function approximation or a quadratic function approximation based on the detected one of the index values or optimum set values.

Accordingly, by solving a simple approximate expression based on the index values or optimum set values at several positions for which different recording linear velocities are set, it is possible to calculate with ease and with a sufficient degree of accuracy the erasing powers and the duty ratio of the pulse width at arbitrary address or recording linear velocity in each zone.

Additionally, according to another aspect of the present invention, there is provided an information recording apparatus that performs recording on an optical disk medium having a recording layer on which mark information is recorded by a laser beam emitted in accordance with a waveform based on a recording pulse sequence while varying a recording clock cycle T in accordance with a variation in a recording linear velocity such that a recording linear density becomes substantially constant, the information recording apparatus including:

a controller that, when performing recording by using a plurality of multiple pulses defined by an erase power Pe1 and an erase power Pe2 as an erasing pulse for forming a space part between mark parts, updates at predetermined intervals in accordance with a recording linear velocity at least one of: set values of the erase power Pe1 and the erase power Pe2; and a set value of a duty ratio Te1 of a pulse width of the erase power Pe1 with respect to the cycle of the multiple pulses;

a pulse width varying part that varies a position of an edge of the erasing pulse for the multiple pulses in accordance with the updated duty ratio Te1; and a driver circuit that updates and controls an amount of light emitted from a laser light source in accordance with the updated erase power Pe1 and the updated erase power Pe2.

Accordingly, even in a case where an information recording method, such as the CAV method, in which the recording linear velocity is varied is used for an optical disk medium corresponding to a wide range of the recording linear velocity, it is possible to perform recording with good overwriting characteristics over an entire surface of the optical disk medium with a simple and small circuit configuration.

Additionally, according to another aspect of the present invention, there is provided an information recording apparatus that performs recording on an optical disk medium having a recording layer on which mark information is recorded by a laser beam emitted in accordance with a waveform based on a recording pulse sequence while varying a recording clock cycle T in accordance with a variation in a recording linear velocity such that a recording linear density becomes substantially constant, the information recording apparatus including:

a controller that, when performing recording by using a plurality of multiple pulses defined by an erase power Pe1 and an erase power Pe2 as an erasing pulse for forming a space part between mark parts, calculates and updates at predetermined intervals set values of the erase power Pe1, the erase power Pe2, and a duty ratio Te1 of a pulse width of the erase power Pe1 that are corresponding to the recording linear velocity by performing an approximation with respect to the recording linear velocity on the set values of the erase power Pe1, the erase power Pe2, and the duty ratio Te1 with respect to the cycle of the multiple pulses, said set values corresponding to one of address information and recording linear velocity information detected from the optical disk medium;

an erasing pulse generation part that varies a position of an edge of the erasing pulse for the multiple pulses in accordance with the updated duty ratio Te1 and generates the multiple pulses defined by the erase power Pe1 and the erase power Pe2; and a driver circuit that updates and controls an amount of light emitted from a laser light source in accordance with the updated erase power Pe1 and the updated erase power Pe2.

Accordingly, even in a case where an information recording method, such as the CAV method, in which the recording linear velocity is varied is used for an optical disk medium corresponding to a wide range of the recording linear velocity, it is possible to calculate the set values for an erasing pulse sequence with respect to a desired recording linear velocity with a simple and small circuit configuration. Also, it is possible to drive a laser light source with a high degree of accuracy. Hence, it is possible to perform recording with good overwriting characteristics and with reduced variations in signal characteristics over an entire surface of the optical disk medium.

Other objects, features and advantages of the present invention will become more apparent from the following detailed description when read in conjunction with the following drawings.

BRIEF DESCRIPTION OF THE DRAWINGS

FIG. 3 is a pulse waveform chart showing the recording pulse sequences used at the innermost track position, the intermediate track position, and the outermost track position of a phase change optical disk in one embodiment of the present invention;

DETAILED DESCRIPTION OF THE PREFERRED EMBODIMENTS

Referring to FIGS. 3A through 8, a description is given below of a first embodiment of the present invention.

As shown in FIG. 3B, in a basic recording pulse sequence used in a phase change optical disk, which is an optical disk medium, the pulse width is set by: a top heating pulse duty ratio Ttop of the top heating pulse constituting a recording pulse sequence; a duty pulse Tmp of a heating pulse in a multi-pulse part following the top heating pulse; and an end-off cooling pulse duty ratio Tecp of the end-off cooling pulse of the recording pulse sequence. In addition, recording power is set by heating power Pw, erase power Pe0, and bias power Pb. With respect to the recording power, since the state of mark formation is affected not only by the erase power Pe0 but also by the heating power Pw in an interacting manner, an erase power ratio $\epsilon 0$ (=Pe0/Pw) of the erase power Pe0 to the heating power Pw is set. In this embodiment, as shown in FIGS. 3C and 3D, a heating pulse (erasing pulse) in an erasing region, which forms a space part between mark parts, is set in more detail by setting a duty ratio Te1 of the erasing pulse for multiple pulses formed by erase power Pe1 and erase power Pe2.

When recording control is performed by using the CAV method with respect to a phase change DVD having a diameter of 120 mm, if the DVD standard recording linear velocity is 3.5 m/s (1-speed), 3-time speed (10.5 m/s) is obtained at the innermost track position and about 7.3-time speed (25.6 m/s) is obtained at the outermost track position as a phase change optical disk corresponding to high speed. The frequency of a recording clock is approximately 78.5 MHz at the innermost track position and approximately 191 MHz at the outermost track position. When the same setting values of a recording pulse sequence are used for the recording linear velocity covering such a wide range, it is difficult for a general phase change optical disk to perform uniform recording.

Figure 1A:
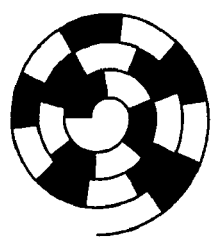
FIG. 1A is a schematic diagram showing a format of a disk in the conventional CLV method.
Figure 1B:
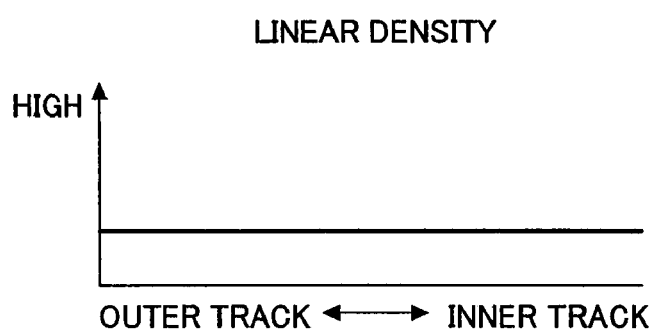
FIG. 1B is a graph showing the relationship between track position and linear density in the conventional CLV method.
Figure 1C:
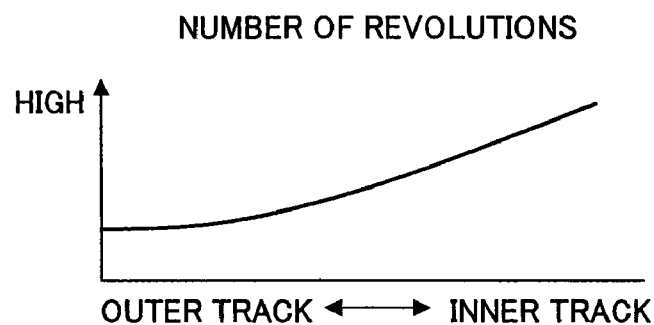
FIG. 1C is a graph showing the relationship between the track position and the number of revolutions in the conventional CLV method.
Figure 1D:
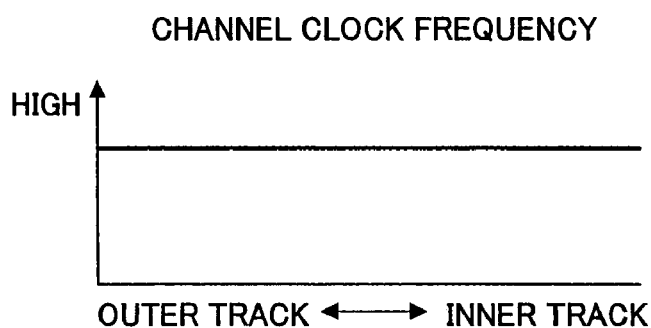
FIG. 1D is a graph showing the relationship between the track position and a channel clock frequency in the conventional CLV method.
Figure 2A:
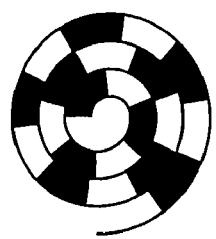
FIG. 2A is a schematic diagram showing a format of a disk in the conventional CAV method.
Figure 2B:
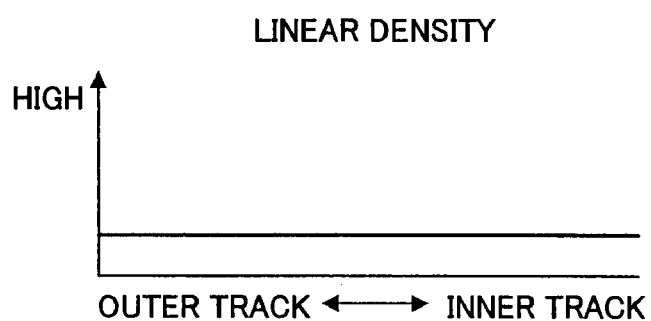
FIG. 2B is a graph showing the relationship between track position and linear density in the conventional CAV method.
Figure 2C:
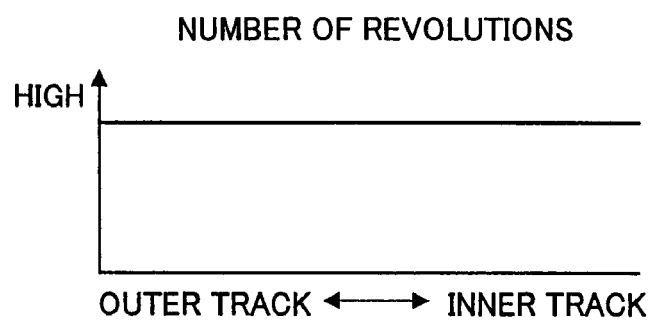
FIG. 2C is a graph showing the relationship between the track position and the number of revolutions in the conventional CAV method.
Figure 2D:
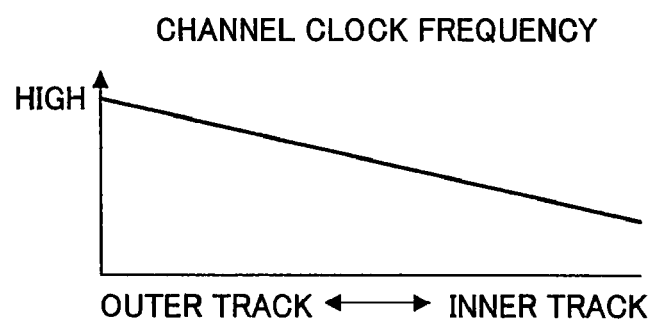
FIG. 2D is a graph showing the relationship between the track position and a channel clock frequency in the conventional CAV method.
Figure 4A:
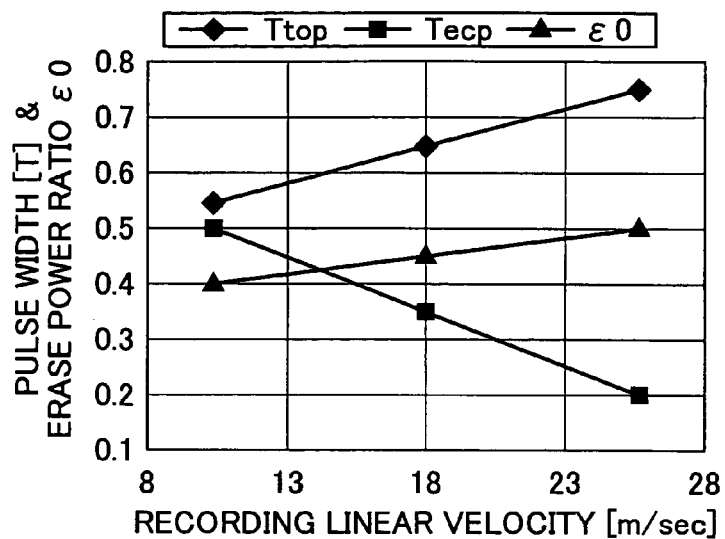
FIGS. 4A, 4B and 4C are graphs for explaining examples of updating Ttop, Tecp, and $\epsilon 0$ in accordance with recording linear velocity.

As the recording linear velocity is increased, heating by heating power Ptop and the duty ratio Ttop of the top heating pulse, and heating power Pmp and the duty ratio Tmp of the multiple pulses following the top heating pulse becomes insufficient, and the degree of modulation of the RF signal is decreased or/and asymmetry is decreased. Hence, as shown in FIG. 4A, by updating the set values Ttop, for example, such that the set values are increased in accordance with the increase in the recording linear velocity, it is possible to apply a sufficient amount of heat in order to maintain good formation of marks.

On the other hand, as the recording linear velocity is increased, the cooling speed is increased. Hence, the average length of formed marks becomes long and the asymmetry of the RF signal is increased. Accordingly, by decreasing the end-off cooling pulse duty ratio Tecp in accordance with the increase in the recording linear velocity, it is possible to maintain the characteristics of the RF signal even at different recording linear velocities.

Figure 5A:
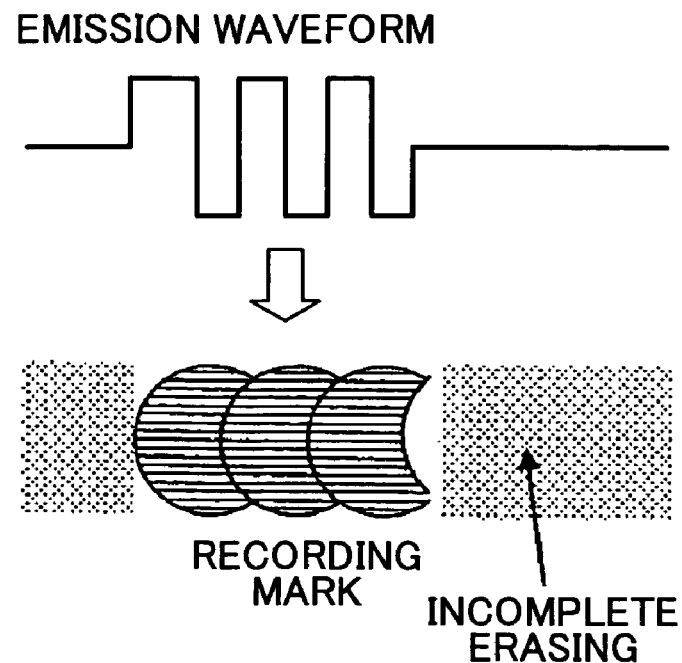
FIGS. 5A and 5B are schematic diagrams for explaining the use of multiple pulses in a space part.

However, with the increase in the recording linear velocity, as shown in FIG. 5A, the erase power required at the time of overwriting also becomes insufficient due to the increase in the cooling speed. Thus, degradation of jitter occurs due to faulty erasing. Accordingly, by updating the set value of the erase power ratio $\epsilon 0$ (=Pe/Pw) such that the set value thereof is increased in accordance with the increase in the recording linear velocity, it is possible to apply sufficient erase power and maintain good formation of spaces.

However, when making a phase change optical disk correspond to high recording linear velocity, the erase power ratio $\epsilon 0$ is reduced compared to a disk corresponding to low speed. This is because even if the erase power is set to a sufficiently high value at which optimum overwriting characteristics are obtained at low speeds, the reflection rate is reduced at high speeds due to formation of an amorphous phase, which is achieved during a cooling state from the time at which the erase power is applied. Thus, with respect to the recording linear velocity in the high-speed side, by dividing an erasing pulse, which constitutes a space part, into multiple pulses (multi-pulse part) and applying a high heating power required for overwriting in combination with a low heating power for relaxing an increase in the cooling speed, recording achieving uniform and good jitter characteristics may be performed while preventing a decrease in the number of times of overwriting.

In this embodiment, in a case where recording is performed while varying the recording linear velocity depending on the radial position by using such a basic waveform as in the CAV method, the set values are updated in the following manner so as to perform good recording over the entire surface of a disk. Specific examples of the set values are as follows. As shown in FIG. 4A, the top heat pulse duty ratio Ttop is varied from 0.55 T ($\approx$7.0 ns) at the minimum velocity (the innermost track position) to 0.75 T ($\approx$3.5 ns) at the maximum velocity (the outermost track position). That is, the set value (the top heat pulse duty ratio Ttop) is updated (varied) such that the set value is varied by 0.2 T in total. Similarly, the end-off cooling pulse duty ratio Tecp is varied from 0.5 T ($\approx$6.4 ns) at the innermost track position to 0.2 T ($\approx$1.0 ns) at the outermost track position. That is, the set value (the end-off cooling pulse duty ratio Tecp) is updated (changed) such that the set value is varied by 0.3 T in total. Additionally, the intervals at which the set value of the end-off cooling pulse duty ratio Tecp is updated are the same as those at which the top heat pulse duty ratio Ttop is updated.

As for the erase power Pe, the set value of the erase power ratio $\epsilon 0$ of the erase power Pe to the heating power Pw is updated (varied) from 0.4 at the innermost track position to 0.5 at the outermost track position, that is, a variation of 0.1 in total.

In this embodiment, each of the set values relating to a recording mark part with respect to the recording linear velocity is calculated by linear approximation (linear expression) by using the set values of the recording linear velocity for two positions: the innermost track position and the outermost track position. Each of the set values may be obtained, for example by using the following approximate expressions.

Figure 4B:
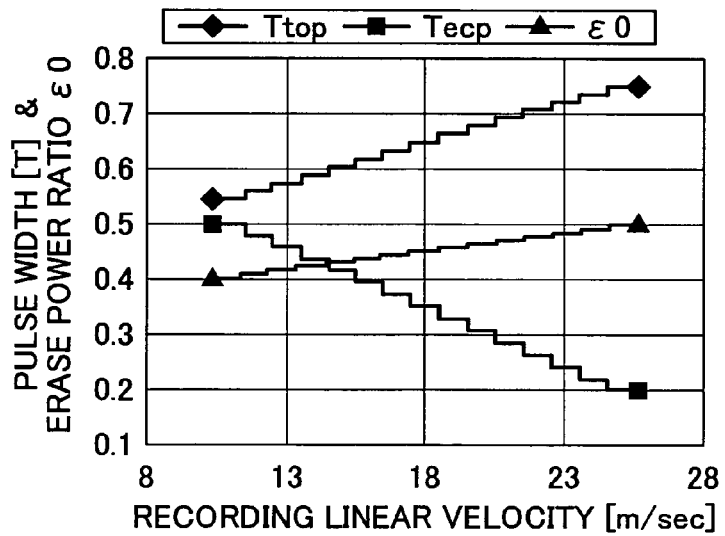
Figure 4C:
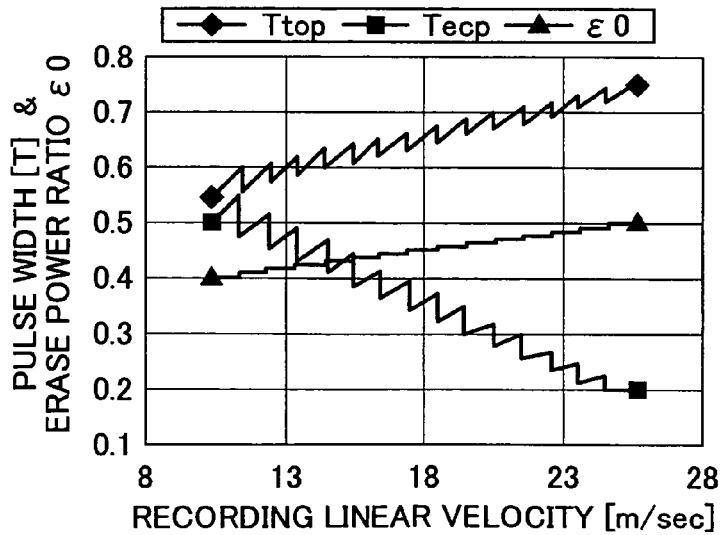

$Ttop[T]=0.013\times LV[m/s]+0.41$ $Tecp[T]=0.007\times LV[m/s]+0.33$ $\epsilon 0=-0.029\times LV[m/s]+1.45$ FIGS. 4B and 4C show cases where each of the set values is updated in stages or at intervals, each stage or interval being approximately 1.0 m/s in the recording linear velocity.

The description is given above of an exemplary setting for recording a recording mark part with low jitter. It should be noted that, in this embodiment, an erasing pulse part (space part) is set in more detail at a high recording linear velocity.

Figure 6A:
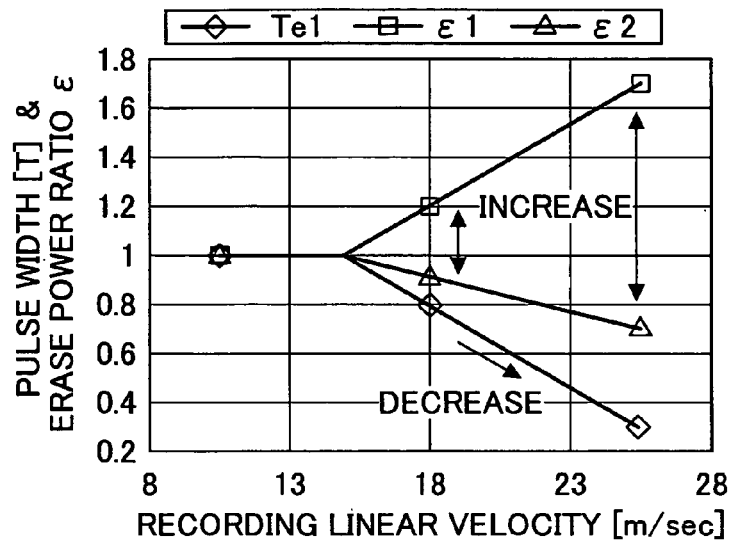
FIGS. 6A, 6B and 6C are graphs for explaining examples of updating Te1, $\epsilon 1$ and $\epsilon 2$ in accordance with the recording linear velocity.
Figure 7A:
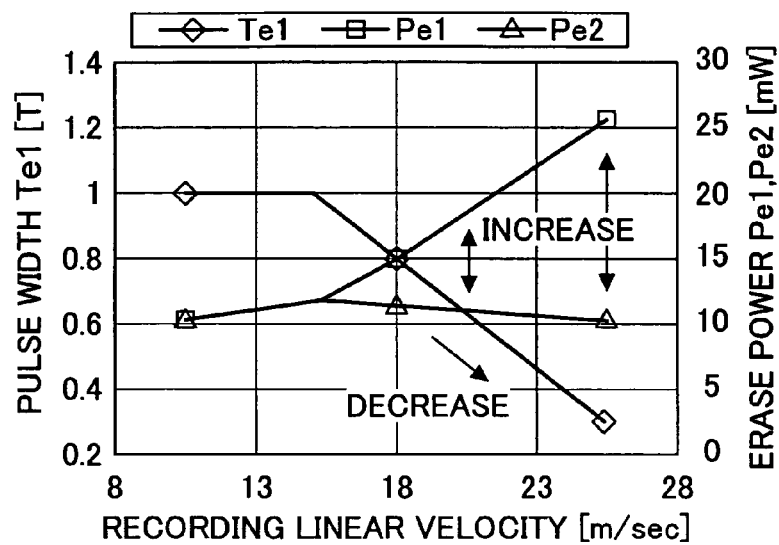
FIGS. 7A, 7B and 7C are graphs for explaining examples of updating Te1, Pe1 and Pe2 in accordance with the recording linear velocity.

Specific examples of the set values are as follows. As shown in FIGS. 6A and 7A, the duty ratio Te1 of an erasing pulse having the erase power of Pe1 is 1 ($\approx$12.7 ns) at the innermost track position but is varied from 0.8 T ($\approx$5.9 ns) at an intermediate track position (intermediate track speed) to 0.3 T ($\approx$1.6 ns) at the outermost track position. That is, the set value of the duty ratio Te1 is updated (varied) such that the set value is decreased by 0.7 T in total.

It can be seen that the duty ratio Te1 of an erasing pulse of the erase power Pe1 is not linearly varied in the range from the innermost track position to the outermost track position. This is because, in a case where recording is performed on a phase change optical disk at the recording linear velocity that is varied in a wide range as mentioned above, it is possible to achieve both overwriting characteristics and jitter characteristics (reproduction signal quality) at a low recording linear velocity even if erasing pulses are of a constant power level. However, at a high recording linear velocity, it is necessary to form an erasing pulse by multiple pulses defined by: a high erase power Pe1, which is a high erasing level; and a low erase power Pe2, which can reduce the average erasing power.

Accordingly, with respect to a phase change optical disk that, between the maximum velocity (at the outermost track position) and the intermediate velocity of the recording linear velocity, uses a recording linear velocity requiring multiple pulses for the erase power as in this embodiment, the duty ratio Te1 of the erase power is decreased or/and the range is set where the difference between the erase power Pe1 and the erase power Pe2 is increased. In addition, as shown in FIG. 6A, the range may be set where the difference between the ratios $\epsilon 1$ and $\epsilon 2$ of the erase power is increased.

That is, various applicable ranges may be used for the recording linear velocity of a phase change optical disk. It is possible to determine the set values relating to an erasing pulse at an arbitrary recording linear velocity based on the parameters (the duty ratio Te1 and the power ratios $\epsilon 1$ and $\epsilon 2$) composing erasing pulses that correspond to the recording linear velocities of at least three positions. In this embodiment, when calculating each of the set values for a recording linear velocity, a region that requires multiple pulses as an erasing pulse is derived from linear approximation (linear expression) by using two kinds of the set values: the set values at the intermediate velocity and those at the maximum velocity. Each of the parameters may be obtained, for example, by using the following approximations.

Figure 6B:
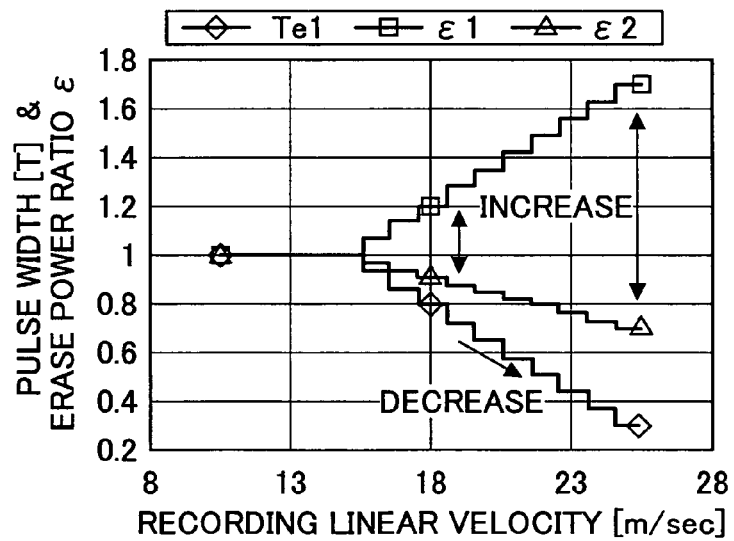
Figure 7B:
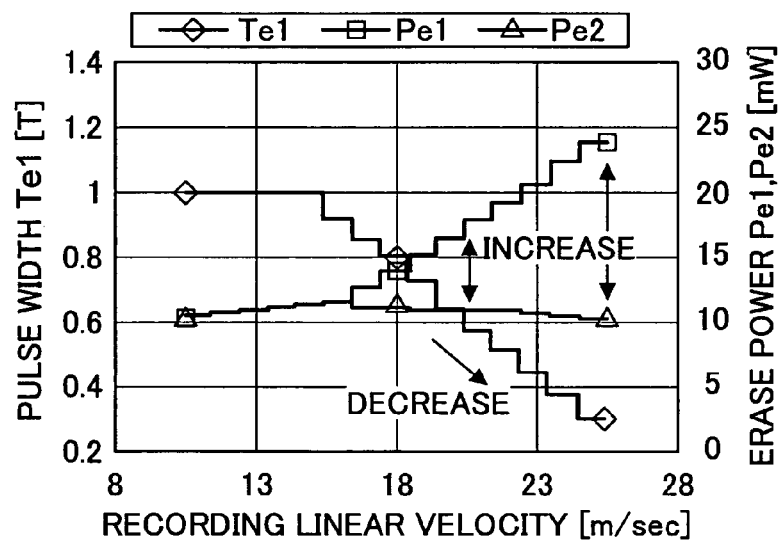

$Te1[T]=-0.066\times LV[m/s]+1.99$ $\epsilon 1=0.066\times LV[m/s]+0.0056$ $\epsilon 2=-0.029\times LV[m/s]+1.45$ Further, approximately 15 m/s is obtained as the recording linear velocity at which all of the set values of Te1, $\epsilon 1$ and $\epsilon 2$ become 1, i.e., an erasing pulse becomes a single pulse, through calculation of the above-mentioned linear approximation. The position corresponding to the obtained recording linear velocity defines the inner track region where an erasing pulse formed by a single pulse, which is used at low recording linear velocity, and the outer track region where an erasing pulse is formed by multiple pulses, which are used at high recording linear velocity. FIGS. 6B and 7B show cases where each of the set values is updated in stages or at intervals, each stage or interval being approximately 1.0 m/s in the recording linear velocity.

In another embodiment of the present invention, the duty ratio of an erasing pulse composed by multiple pulses may be set to a fixed value, and only the set values of the erase powers Pe1 and Pe2 may be updated in accordance with the variation of the recording linear velocity. In this case, by correcting the erase power ratios $\epsilon 1$ and $\epsilon 2$ so as to calculate an optimum value with respect to the erase power, it is possible to perform recording while practically preventing degradation of jitter characteristics and overwriting characteristics.

In still another embodiment of the present invention, the erase power Pe1 (or $\epsilon 1$) and the erase power Pe2 (or $\epsilon 2$) of an erasing pulse composed by multiple pulses may be set to fixed values, and the set value of the duty ratio Te1, which is the pulse width of the erase power Pe1 with respect to the multi-pulse cycle, may be updated in accordance with the variation of the recording linear velocity. In this case, by correcting the duty ratio Te1 of an erasing pulse so as to calculate an optimum value with respect to the duty ratio serving as an execution value instead of setting again the erase power level in accordance with the recording linear velocity, it is possible to perform recording while practically preventing degradation of jitter characteristics and overwriting characteristics.

Figure 5B:
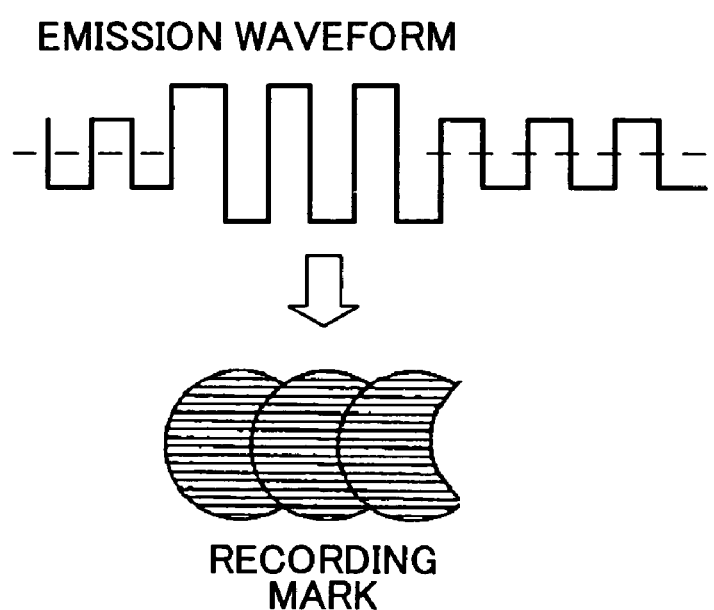

The recording speed for a phase change optical disk depends on the crystallization speed of the material of a recording layer. For this reason, there exists two kinds of ranges for the recording linear velocity: a range allowing good erasing with a single erasing pulse and erase power; and a range allowing the optimum erasing without faulty erasing with multiple erasing pulses and erase powers as shown in FIG. 5B. Accordingly, at least in the recording linear velocity range in which multiple erasing pulses are used, the erase power Pe1 is increased, which is the higher erase power and affects the overwriting characteristics, to a further higher power in accordance with the increase of the recording linear velocity. Additionally, with respect to the jitter characteristics, which are signal characteristics, the erase power Pe2 is decreased, which is the lower erase power, to a further lower power in accordance with the increase of the recording linear velocity. That is, in yet another embodiment of the present invention, by increasing the difference between the erase power Pe1 and the erase power Pe2, i.e., by decreasing the duty ratio Te1, in accordance with the increase of the recording linear velocity, it is possible to achieve both the overwriting characteristics and the jitter characteristics.

Figure 8:
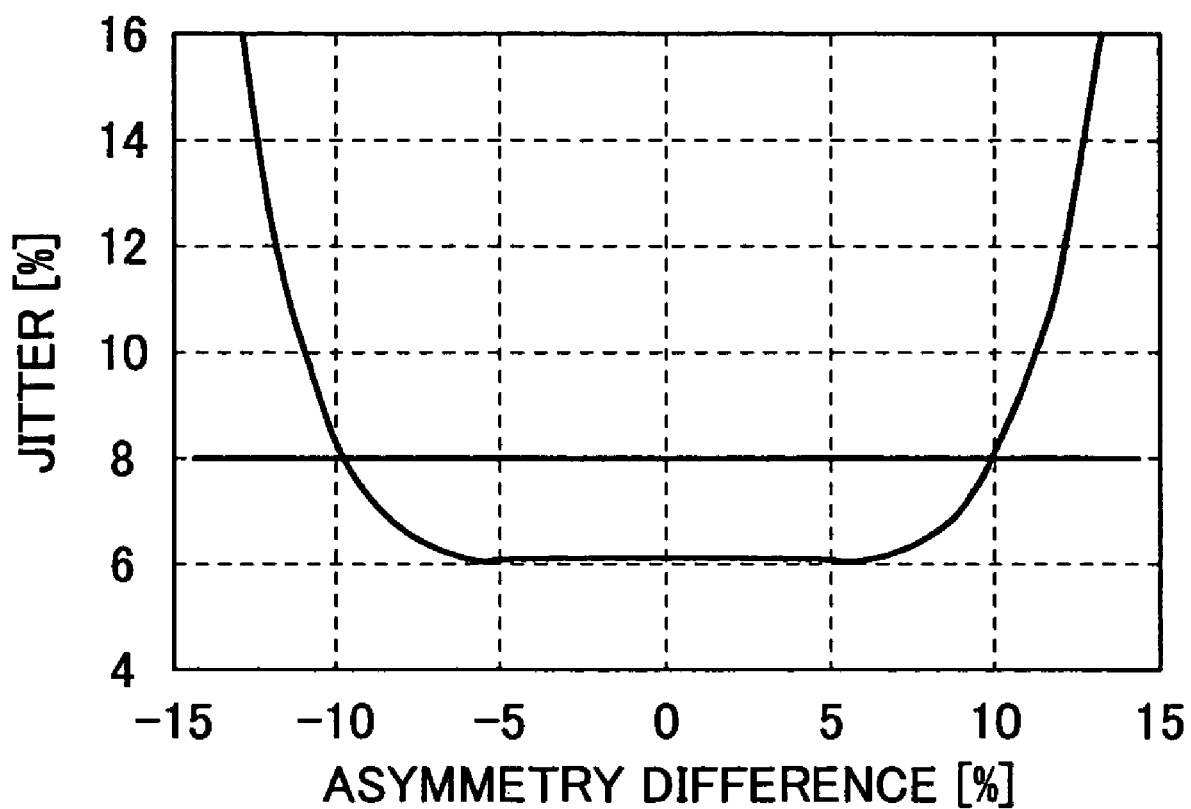
FIG. 8 is a graph showing asymmetry characteristics.

A shift does not occur in the degree of modulation or/and asymmetry of a reproduced RF signal at the time of updating (varying). As shown in FIG. 8, the asymmetry is the value obtained by normalizing the difference between the average level of the longest data amplitude of the RF signal and the average level of the shortest data amplitude thereof by the longest data amplitude. The asymmetry represents the asymmetry between the mark length and the space length. In the case of EFM pulse modulation, asymmetry=[(I 14H+I 14L)/2−(I 3H+I 3L)/2]/(I 14H−I 14L)

where I 14H is 14T space level, I 14L is 14T mark level, I 3H is 3T space level, and I 13L is 3T mark level.

As for the heating power Pw and the erase power ratio ϵ0, the most preferred values thereof may be obtained in accordance with the recording linear velocity by test writing (OPC). In this embodiment, different setting values of the heating power Pw and the erase power ratio ϵ0 may be set for the minimum velocity (at the innermost track position), the maximum velocity (at the outermost track position), and the intermediate velocity.

In terms of the reproduction signal and the overwriting characteristics, it is preferable to make the step or interval at which each of the set values is updated as fine as possible. However, this increases the work load of a controller. It is preferable for the asymmetry difference between the longest data and the shortest data, which significantly affects the jitter characteristics, to fall within the range of approximately ±10%. As shown in FIG. 8, when the asymmetry difference before and after updating (varying) of the set values is close to ±10%, the jitter characteristics are sharply degraded. It is difficult to perform accurate binarization with a time constant obtained by a slice circuit for binarizing the RF signal, which results in a large edge shift in the RF signal. In some cases, PLL for generating a reproduction clock may be unlocked. More particularly, it is preferable to finely update the set values in consideration of the jitter characteristics and the stability of PLL.

Each of the above-mentioned set values (the erase powers Pe1 and Pe2, and the duty ratio Te1, which is the width of an erasing pulse) has its own effects. However, since characteristic variation of the RF signal has interaction, it is preferable to update at least two of the set values. As will be appreciated, it is most effective to update all of the three set values as in this embodiment.

It should be noted that each of the above-mentioned set values is a typical value of a phase change optical disk and may be set to a different value by, for example, various tunings and various compositions of a material of the recording layer. Conventionally, in phase change optical disks, there has been used, for example, the recording layer of the GeSbTe system, the GeTeSbS system, the TeGeSnAu system, the GeTeSn system, the SbSe system, the SbSeTe system, the SnSeTe system, the GaSeTe system, the GaSeTeGe system, the GaGeSbTe system, the GaSb system, the InSe system, the InSeTe system, and the AgInSbTe system. In this embodiment, a material of the AgInSbTe system is used for the recording layer.

In such a phase change optical disk, formation of an amorphous phase highly depends on change in a rapid cooling condition of heating→cooling caused by variation in the recording linear velocity, and the state of a crystal depends on change of cooling→heating caused by variation in the recording linear velocity, which affects the overwriting characteristics. That is, the shape and size of a mark is affected by the top heating pulse duty ratio Ttop and the end-off cooling pulse duty ratio Tecp, corresponding to the front and rear edge portions of the mark, respectively, and the erase power ratio ϵ0. Additionally, the noise level (jitter characteristics) of a space part is affected by the erase power level during an erasing pulse period. It is possible to control the shape and the characteristics of a mark with a high degree of accuracy by the waveforms of the recording and erasing pulses. In addition, it is understood that there is a tendency that the optimum values of the set values of a recording pulse sequence and an erasing pulse sequence can be approximated almost linearly with respect to the recording linear velocity, and that the recording layer using a material of the AgInSbTe system, for example, is particularly easily controlled. However, even if other materials are used for the recording layer, the relationship between the erase power or the erasing pulse and the jitter characteristics or the overwriting characteristics and the relationship between the width of a recording pulse and the mark length are the same. Hence, it is preferable to use a material of the AgInSbTe system for the recording layer.

Referring to FIG. 8, a description is given below of a second embodiment of the present invention.

Generally, a wobbled groove is formed on a phase change optical disk for obtaining a tracking error signal (push-pull signal). Wobble signals obtained from the wobble of the groove are superimposed. Each of the wobble signals is detected by a programmable BPF (Band Pass Filter) at each recording linear velocity, as is described below. The wobble signals include address information coded by frequency modulation or phase modulation. By demodulating the address information, it is possible to obtain as the pre-format information the address information and disk information that are inherent to a disk even from an unrecorded disk. A method is also known in which such information is generated from intermittent pits (Land Pre-Pit signal) provided in a land portion of a disk.

The optimum top heating pulse duty ratio Ttop, the end-off cooling pulse duty ratio Tecp, the erase power ratio ϵ0, the erase power ratio ϵ1, the erase power ratio ϵ2, and the erasing pulse duty ratio Te1 at a plurality of recording linear velocities, such as the minimum recording linear velocity (at the innermost track), the maximum recording linear velocity (at the outermost track), and the intermediate recording linear velocity (at the intermediate track), are embedded in such disk information (pre-format).

Figure 9:
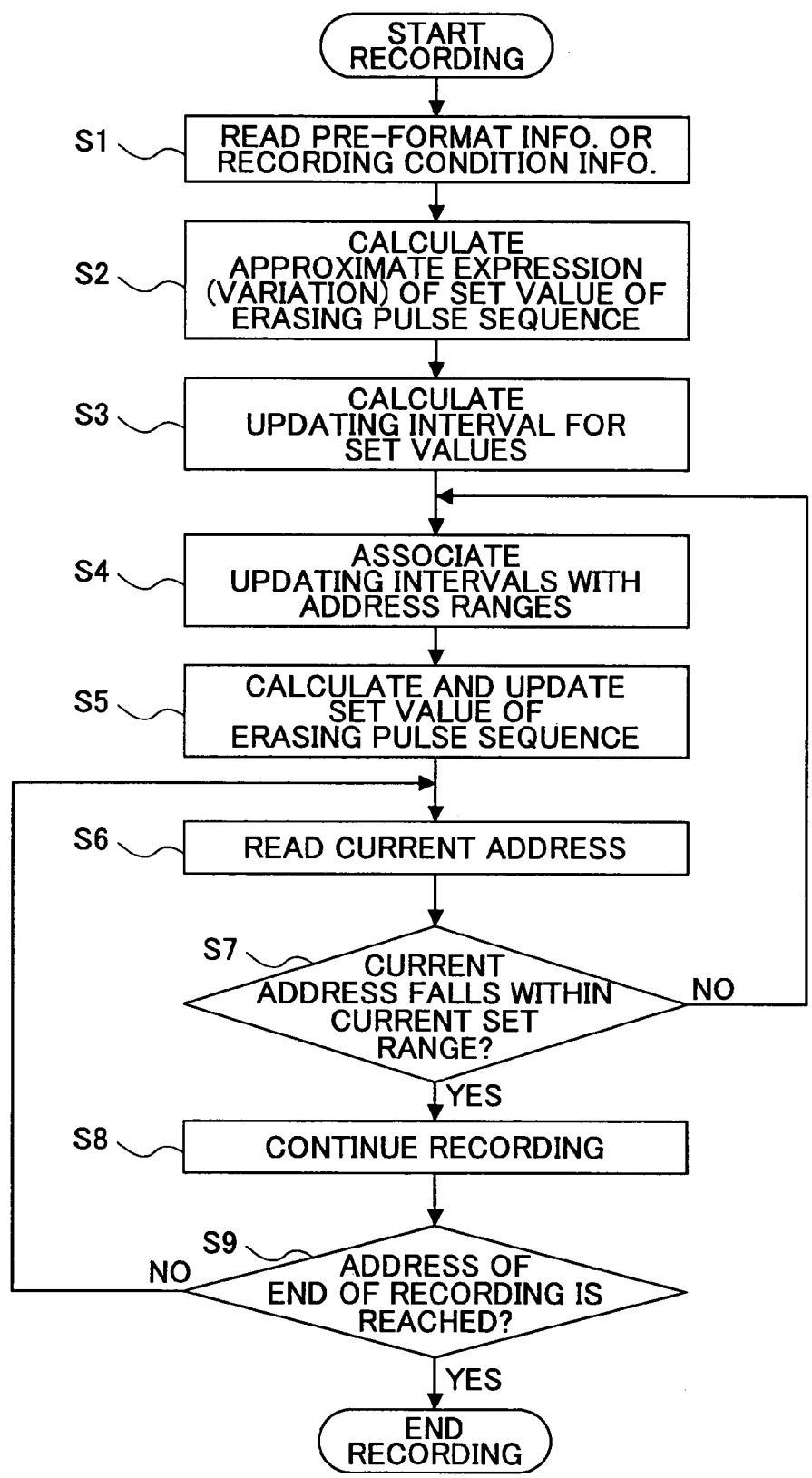
FIG. 9 is a flow chart for explaining an information recording method according to a second embodiment of the present invention.

Referring to FIG. 9, a description is given below of an information recording method according to the second embodiment of the present invention.

First, in step S1, the pre-format information or the recording condition information is read so as to obtain the optimum setting values for each recording linear velocity. Then, in step S2, the variations (or the inclinations) of the set values that are linearly approximated (linear expression) with respect to arbitrary recording linear velocities are calculated. It should be noted that the variations or the inclinations may be calculated in accordance with the characteristics of an optical disk medium, and may be calculated by an approximate expression (quadratic expression) other than linear approximation.

In step S3, update intervals for the set values are calculated from the range of the recording linear velocity in the entire surface of a disk as in the CAV method (in this embodiment, the interval is set to approximately 1.0 m/s).

The variations of the set values thus obtained are in relation to the recording linear velocity. In practice, the variations are recognized, for example, in relation to arbitrary address information during recording, which is obtained by demodulation of the above-mentioned wobble signal and the LPP signal. Specific addresses are determined from the innermost track position to the outermost track position and can be associated with the recording linear velocity. Therefore, in step S4, the intervals at which the set values are updated and the ranges of addresses corresponding to the intervals are associated. Thereby, it is possible to update the set values, as in step S5, when the addresses at which the set values are to be updated are reached. During actual recording involving variation in the recording linear velocity such as recording according to the CAV method or the ZCLV method, while reading a current address in step S6, it is determined in step S7 whether the current address in recording falls within the current set range. When the current address is outside the set range (NO in step S7), the set values are updated to newly calculated values in steps S4 and S5. Thus, it is possible to continuously perform recording. When the current address falls within the set range (YES in step S7), recording is performed in step S8 by using the calculated set values as mentioned above. In step S9, it is determined whether the address of the end of recording is reached. When the decision result in step S9 is NO, the process returns to step S6. Similar processes are repeated until the address of the end of recording is reached (YES in step S9). When the decision result in step S9 is YES, the recording ends.

With such a recording method, it is possible to significantly reduce the work load on the controller for controlling/managing a recording pulse sequence.

Figure 10:
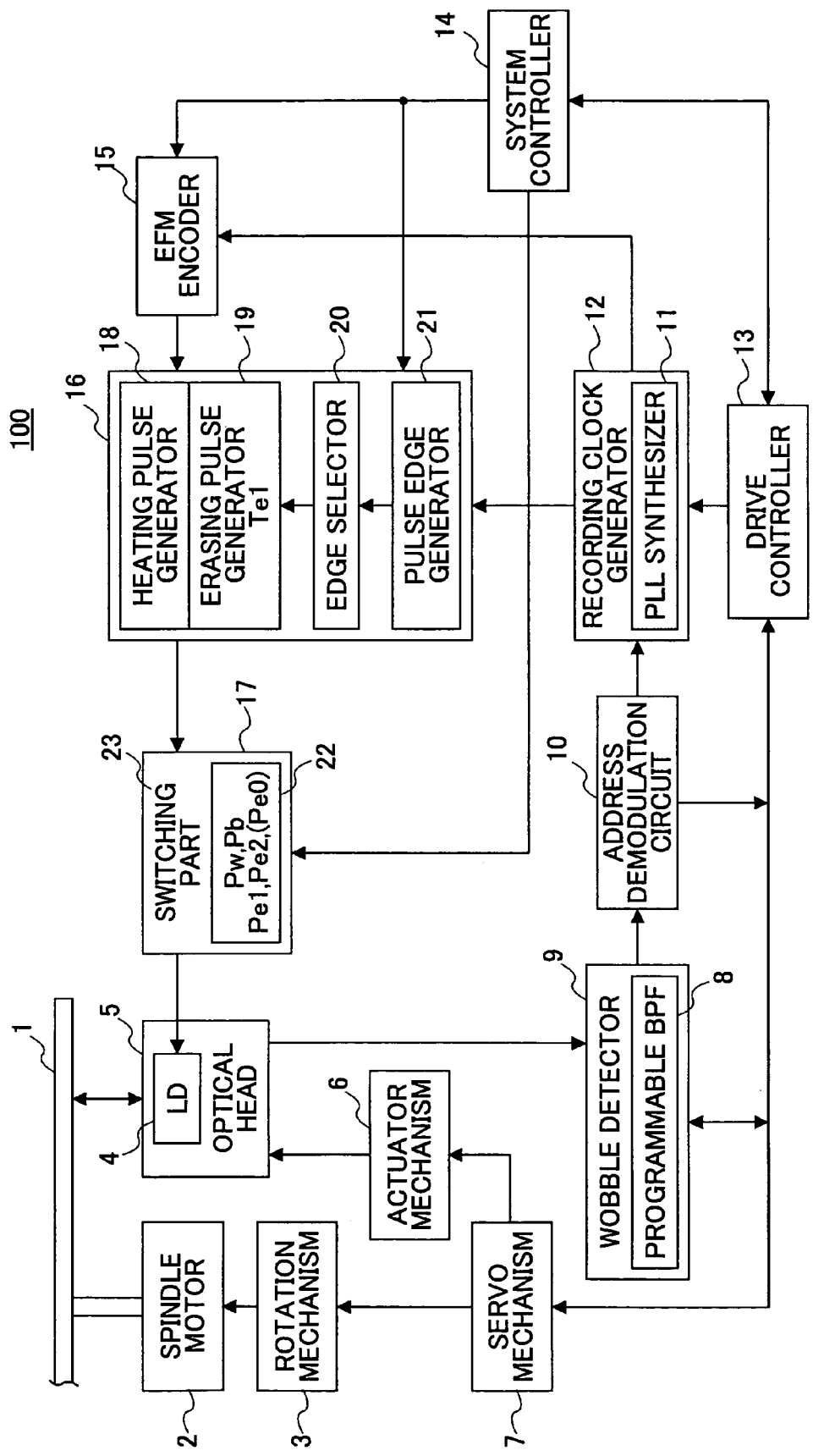
FIG. 10 is a block diagram showing the structure of an information recording apparatus according to a third embodiment of the present invention.

Referring to FIG. 10, a description is given below of a third embodiment of the present invention. This embodiment relates to an information recording apparatus for performing recording on a phase change optical disk medium 1 by using the information recording method in which the set values of the duty ratio Te1 of the width of an erasing pulse and the erase powers Pe1 and Pe2 for dividing the erasing pulse part (space part) into multiple pulses are updated in accordance with the variation in the recording linear velocity.

FIG. 10 is a block diagram showing an information recording apparatus 100 according to the third embodiment of the present invention.

The information recording apparatus 100 includes: a spindle motor 2, a rotation mechanism 3, an optical head 5; an actuator mechanism 6; a servo mechanism 7; a wobble detector 9; an address demodulation circuit 10; a recording clock generator 12; a drive controller 13; a system controller 14; an EFM encoder 15; an erasing pulse sequence controller 16; and a LD driver 17.

The rotation mechanism 3 includes the spindle motor 2 that rotates the optical disk medium 1. The optical head 5 is provided with: a light receiving part; an objective lens for converging laser light with respect to the optical disk medium 1; and a light source such as a semiconductor laser (LD) 4. The optical head 5 performs tracking along a track (groove). Hence, the actuator mechanism 6, which drives the objective lens of the optical head 5, is radially movable for seeking. The rotation mechanism 3 and the actuator mechanism 6 are connected to the servo mechanism 7. The optical head 5 is connected to the wobble detector 9 including a programmable BPF 8. The wobble detector 9 is connected to the address demodulation circuit 10, which demodulates an address from a detected wobble signal. The address demodulation circuit 10 is connected to the recording clock generator 12 including a PLL synthesizer circuit 11. The PLL synthesizer circuit 11 is connected to the drive controller 13. The drive controller 13 is connected to the system controller 14. The drive controller 13 is also connected to the servo mechanism 7, the wobble detector 9, and the address demodulation circuit 10.

The system controller 14 is connected to the EFM encoder 15, the recording/erasing pulse sequence controller 16, and the LD driver 17. The recording/erasing pulse sequence controller 16 includes: a heating pulse generator 18; an erasing pulse generator 19; an edge selector 20; and a pulse edge generator 21. The heating pulse generator 18 generates a heating pulse control signal including top heating pulses and heating pulses in multi-pulse parts following the top heating pulses. The erasing pulse generator 19 generates an erasing pulse control signal including erasing pulses in multi-pulse parts of erasing pulse regions. The edge selector 20 is a selector and is described later. The pulse edge generator 21 is formed by: a multi-stage delay element using a gate element and constituting an edge signal generation circuit; a PLL (multiply circuit); or a ring oscillator. The output of the recording/erasing pulse sequence controller 16 is connected to the LD driver 17, which is a driver circuit for driving the semiconductor laser 4 of the optical head 5 by switching via a switching part 23 respective drive current sources 22 for the heating power Pw, the cooling power (bias power) Pb, the erase power Pe1, the erase power Pe2, and the erase power Pe0.

In such a structure, the center frequency of the BPF corresponding to the recording linear velocity is set to the programmable BPF 8 by the drive controller 13. Addresses are demodulated by the address demodulation circuit 10 from the wobble signal detected by the wobble detector 9. A recording channel clock at an arbitrary recording linear velocity is generated by the PLL synthesizer circuit 11, whose basic clock frequency is varied by the drive controller 13, and is output to the recording/erasing pulse sequence controller 16.

For generating a recording pulse sequence by the semiconductor laser 4, the recording channel clock and EFM data, which are recording information, are input to the recording/erasing pulse sequence controller 16 from the recording clock generator 12 and the EFM encoder 15, respectively. The heating pulse generator 18 of the recording/erasing pulse sequence controller 16 generates the heating pulse control signal including top heating pulses and heating pulses in multi-pulse parts following the top heating pulses. The erasing pulse generator 19 generates from the EFM data the erasing pulse control signal including erasing pulses having multi-pulse structures. The LD driver 17 performs switching of the respective drive current sources 22 for the heating power Pw, the erase powers Pe1 and Pe2, and the bias power Pb.

At the time of recording, it is possible to obtain the laser emission waveforms of a multi-pulse sequence as shown in FIG. 3, by causing the semiconductor laser 4 to steadily emit light at the bias power Pb, corresponding to the cooling power, by the drive current source for the bias power Pb, and applying the heating pulse control signal and the erasing pulse control signal (see FIG. 3-(E)) generated respectively by the heating pulse generator 18 and the erasing pulse generator 19.

In this embodiment, a recording pulse sequence control signal, formed by the top heating pulse control signal, the heating pulse control signal of multi-pulse parts following the top pulses, and the end-off cooling pulse control signal, is generated. The recording pulse sequence control signal is generated by arranging a multi-stage delay (gate delay) element having the delay amount of about 0.3 ns in a top heating pulse generator in the heating pulse generator 18, generating a plurality of edge pulses from the EFM data, inputting the generated multi-stage edge pulse into the edge selector 20 formed by a multiplexer, and varying the front edges and the rear edges by edge pulses selected by the system controller 14. In addition, the erasing pulse generator 19 generates the erasing pulse control signal whose duty ratio Te1 of the width of an erasing pulse is set to a calculated target duty ratio by edge pulses selected by the system controller 14.

Therefore, according to the information recording apparatus of this embodiment, with a simple and small circuit configuration, it is possible to easily update(set) the set values including the top heating pulse duty ratio Ttop, the end-off cooling pulse duty ratio Tecp, the erase power ratio $\epsilon 1$, the erase powers Pe1 and Pe2 in erasing regions, and the duty ratio Te1 of the width of an erasing pulse. Thus, it is possible to perform recording that corresponds to variation in the recording linear velocity in the CAV method or ZCLV method using the information recording method of the present invention.

With such a structure, each of the set values is determined as in the above-mentioned information recording method, an optimum edge pulse is selected at a desired recording linear velocity, and a desired recording pulse is generated. Additionally, when the generated erasing pulse is updated at predetermined intervals, each of the set values is varied in a stair-like pattern as shown in FIGS. 6B and 7B. Thus, when the multi-stage delay element is used, during an updating interval, each pulse width becomes a fixed value, and the duty ratio of the pulse width is varied in accordance with the variation in the recording channel clock.

In a variation of this embodiment, instead of the multi-stage delay element that is provided in the erasing pulse generator 19 and generates the erasing pulse width Te1, a pulse edge generator having a PLL structure may be used that uses a phase comparator, a loop filter, a VCO (voltage controlled oscillator), and a divider. In such a structure, a high resolution clock, which is 20 times the frequency of the recording channel clock, is generated by the PLL, and the pulse edge signal has a resolution of about 0.05 T. After inputting such a multi-stage pulse edge signal into the edge selector 20 having the multiplexer structure, an edge signal is generated that varies edge positions forming the erasing pulse Pe1 and calculated by the front edge pulse and the rear edge pulse selected by the system controller 14.

Further, the pulse edge generator 21 may be a ring oscillator that is formed by a plurality of number of voltage-control type delay elements in series and performs voltage control such that a final stage signal becomes a clock of desired times by a phase comparator and a loop filter.

With such a structure, each of the set values is determined as in the above-mentioned information recording method, an optimum edge pulse for a desired recording linear velocity is selected, and desired erasing pulses are generated.

Figure 6C:
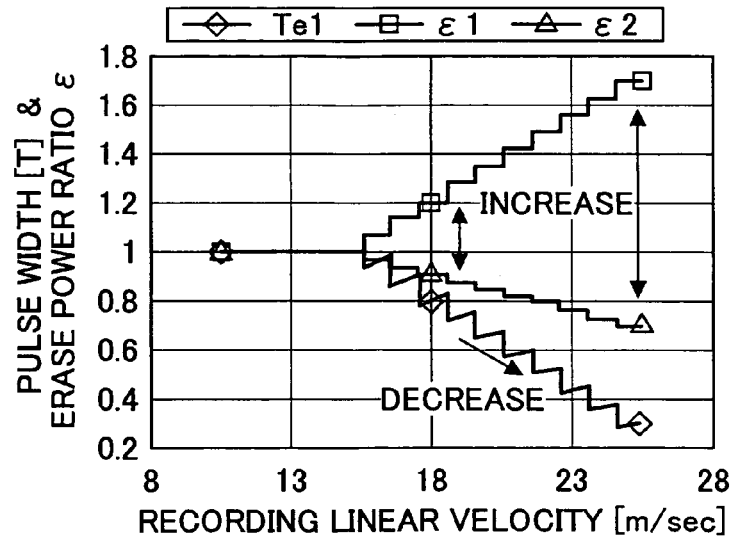
Figure 7C:
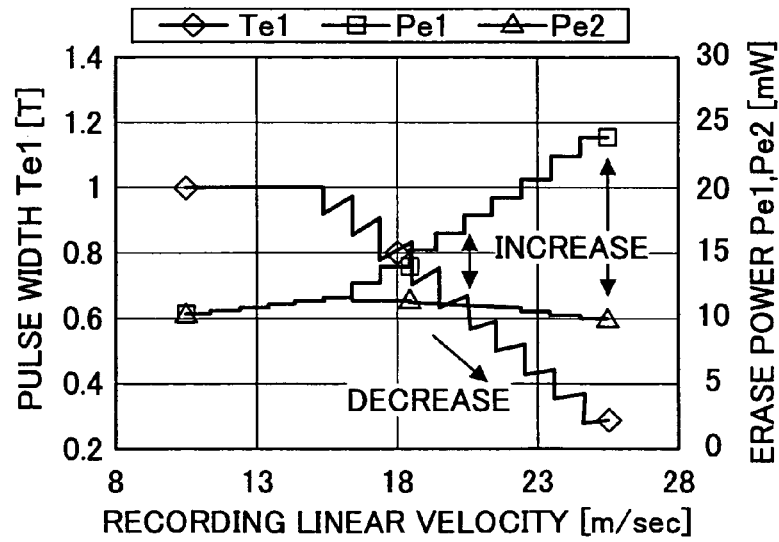

In a structure using a plurality of delay elements, when the top recording pulse width Ttop, the end-off cooling pulse width Tecp, and the erasing pulse width Te1 are updated at predetermined intervals, the set value of each pulse width during an update interval is varied in a sawtooth shape as shown in FIGS. 4C, 6C and 7C.

In a structure using the pulse edge generator 21 having a PLL structure or formed by a ring oscillator, each of the set values during an update interval becomes a constant value with respect to the variation in the recording clock frequency as shown in FIGS. 4B, 6B and 7B.

It should be noted that, according to the present invention, it is possible to perform uniform recording at the time of CAV recording in each of the above-mentioned structures. Additionally, various circuits may be used for the recording pulse generator (the recording/erasing pulse sequence controller 16).

Thus, according to the information recording apparatus of this embodiment, with a simple and small circuit configuration, it is possible to perform recording according to the CAV control using the information recording method that includes updating of the duty ratio Te1 of the pulse width of an erasing pulse, and the erase powers Pe1 and Pe2. Although the description is given above by taking an example where the present invention is applied to the CAV method, the present invention may also be similarly applied to the ZCLV method.

In an embodiment of the present invention, even if the recording linear velocity is varied as in the CAV method and the erase condition of an optical disk medium varies, it is possible to constantly supply a sufficient erase power by using the erase power Pe1 in the multiple pulses without increasing the average erase power. Also, since the set values of the eraser powers Pe1 and Pe2 are sequentially updated (set) at predetermined intervals in accordance with the recording linear velocity, it is possible to perform recording with good overwriting characteristics over an entire surface of the optical disk medium.

Additionally, in an embodiment of the present invention, even if the erase condition of an optical disk medium varies with a variation in the recording linear velocity as in the CAV method, an optimum duty ratio of the pulse width of the erase power is sequentially and constantly updated (set). Hence, it is possible to perform recording with good overwriting characteristics over an entire surface of the optical disk. Particularly, when varying the duty ratio of the pulse width of the erasing pulse, the edge position of the erasing pulse of the erase power Pe1 may be varied in accordance with the recording linear velocity. Thus, the control is easy and the process can be simplified.

Further, in an embodiment of the present invention, even if the recording linear velocity is varied as in the CAV method and the erase condition of an optical disk medium varies, it is possible to constantly supply a sufficient erase power by using the erase power Pe1 in the multiple pulses without increasing the average erase power. Also, since the set values of the eraser powers Pe1 and Pe2 are sequentially updated (set) at predetermined intervals in accordance with the recording linear velocity, it is possible to perform recording with good overwriting characteristics over an entire surface of the optical disk medium. Particularly, when varying the duty ratio of the pulse width of the erasing pulse, the edge position of the erasing pulse of the erase power Pe1 may be varied in accordance with the recording linear velocity. Thus, the control is easy and the process can be simplified.

In a case where a recording linear velocity range that requires an erasing pulse divided into multiple pulses is to be covered, the erase power Pe1, which is the higher power and affects the overwriting characteristics, is increased to a higher power in accordance with an increase in the recording linear velocity. Also, with respect to jitter characteristics, which are signal characteristics, the erase power Pe2, which is the lower power, is reduced to a lower power in accordance with the increase in the recording linear velocity. However, in an embodiment of the present invention, by increasing the difference between the erase powers Pe1 and Pe2 in accordance with the increase in the recording linear velocity, it is possible to achieve both overwriting characteristics and jitter characteristics.

In a case where a recording linear velocity range that requires an erasing pulse divided into multiple pulses is to be covered, the erase power Pe1, which is the higher power and affects the overwriting characteristics, is increased to a higher power in accordance with an increase in the recording linear velocity. Also, with respect to jitter characteristics, which are signal characteristics, the erase power Pe2, which is the lower power, is reduced to a lower power in accordance with the increase in the recording linear velocity. However, in an embodiment of the present invention, by decreasing the duty ratio Te1 of the pulse width of the erase power Pe1 with respect to the cycle of the multiple pulses in accordance with the increase in the recording linear velocity, it is possible to achieve both overwriting characteristics and jitter characteristics.

In addition, in an embodiment of the present invention, it is possible to determine the minimum intervals for updating the set values without calculating through test writing the initial values of the erase power values and the duty ratio of the pulse width of the erasing pulse formed by the multiple pulses. Also, it is possible to perform recording with uniform characteristics over an entire surface of the optical disk medium by a simple method.

Additionally, in an embodiment of the present invention, even in a case where recording or overwriting is performed on the optical disk medium, by using the optimum set values that are obtained from the optimum set values recorded in a previous time, it is possible to determine the minimum intervals for updating the set values without calculating again the erase power values and the duty ratio of the pulse width of the erasing pulse formed by the multiple pulses. Thus, it is possible to reduce the process time required until recording is started. Also, it is possible to perform recording with uniform characteristics over an entire surface of the optical disk by a simple method.

Further, in an embodiment of the present invention, even during recording, it is possible to easily and accurately determine the intervals for updating the set values such that the calculated optimum set values of an erasing pulse sequence formed by multiple pulses are not shifted. Thus, even if the recording linear velocity is varied and the erase condition of an optical disk medium varies as in the CAV method, it is possible to constantly update with a high degree of accuracy the optimum erase powers and the optimum duty ratio of the pulse width of the erasing pulse. Hence, it is possible to perform recording with good overwriting characteristics over an entire surface of the optical disk medium.

In addition, in an embodiment of the present invention, by solving a simple approximate expression based on the index values or optimum set values at several positions for which different recording linear velocities are set, it is possible to calculate with ease and with a sufficient degree of accuracy the erasing powers and the duty ratio of the pulse width at an arbitrary address or recording linear velocity in each zone.

Additionally, in an embodiment of the present invention, even in a case where an information recording method, such as the CAV method, in which the recording linear velocity is varied is used for an optical disk medium corresponding to a wide range of the recording linear velocity, it is possible to perform recording with good overwriting characteristics over an entire surface of the optical disk medium with a simple and small circuit configuration.

Additionally, in an embodiment of the present invention, even in a case where an information recording method, such as the CAV method, in which the recording linear velocity is varied is used for an optical disk medium corresponding to a wide range of the recording linear velocity, it is possible to calculate the set values for an erasing pulse sequence with respect to a desired recording linear velocity with a simple and small circuit configuration. Also, it is possible to drive a laser light source with a high degree of accuracy. Hence, it is possible to perform recording with good overwriting characteristics and with reduced variations in signal characteristics over an entire surface of the optical disk medium.

The present invention is not limited to the specifically disclosed embodiments, and variations and modifications may be made without departing from the scope of the present invention.

The present application is based on Japanese priority application No. 2003-196865 filed on Jul. 15, 2003, the entire contents of which are hereby incorporated by reference.

What is claimed is:

1. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts, updating set values of the erase power Pe1 and the erase power Pe2 at predetermined intervals in accordance with the recording linear velocity such that the difference between the erase power Pe1 and the erase power Pe2 is increased in accordance with an increase in the recording linear velocity.

2. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant;

when performing recording by using multiple pulses defined by an erase power Pe1 and an erase power Pe2 as an erasing pulse for forming a space part between mark parts, updating set values of the erase power Pe1 and the erase power Pe2 at predetermined intervals in accordance with the recording linear velocity; and updating set values of a coefficient $\epsilon 1$ and a coefficient $\epsilon 2$ at predetermined intervals in accordance with the recording linear velocity such that the difference between the coefficient $\epsilon 1$ and the coefficient $\epsilon 2$ is increased in accordance with an increase in the recording linear velocity, where, when an erase power Pe0 for a single erasing pulse is a target power, the erase power Pe1 is defined as Pe1=$\epsilon 1 \times$Pe0, and the erase power Pe2 is defined as Pe2=$\epsilon 2 \times$Pe0.

3. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts, updating set values of the erase power Pe1 and the erase power Pe2 at predetermined intervals in accordance with the recording linear velocity, and wherein the step of updating comprises the steps of:

updating a set value of a duty ratio Te1 of a pulse width of the erase power Pe1 at predetermined intervals in accordance with the recording linear velocity;

detecting index values which are pre-formatted on the optical disk medium of a plurality of recording linear velocities, the erase powers Pe1 and the erase powers Pe2 corresponding to the recording linear velocities, and duty ratios Te1 of a pulse width of the erasing pulse corresponding to the recording linear velocities;

calculating variations in the set values of the erase power Pe1, the erase power Pe2, and the duty ratio Te1 that are updated at the predetermined intervals based on the detected index values; and setting the erase power Pe1 and the erase power Pe2 with respect to the desired recording linear velocity.

4. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts:

updating a set value of a duty ratio Te1 of a pulse width of the erase power Pe1 at predetermined intervals in accordance with the recording linear velocity;

detecting address information that is pre-formatted on the optical disk medium;

calculating the set values of the erase power Pe1, the erase power Pe2, and a duty ratio Te1 of a pulse width of the erasing pulse with respect to the address information corresponding to the recording linear velocity from variations in the set values that are updated at predetermined intervals; and calculating the set values of the erase power Pe1, the erase power Pe2, and the duty ratio Te1 with respect to desired address information by associating the predetermined intervals with corresponding ranges of the address information.

5. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant;

when performing recording by using multiple pulses defined by an erase power Pe1 and an erase power Pe2 as an erasing pulse for forming a space part between mark parts, updating a set value of a duty ratio Te1 of a pulse width of the erase power Pe1 with respect to a cycle of the multiple pulses at predetermined intervals in accordance with the recording linear velocity; and updating a set value of a duty ratio Te1 of a pulse width of the erase power Pe1 at predetermined intervals in accordance with the recording linear velocity such that the duty ratio Te1 with respect to the cycle of the multiple pulses defined by the erase power Pe1 and the erase power Pe2, where Pe1>Pe2, is decreased in accordance with an increase in the recording linear velocity.

6. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant;

when performing recording by using multiple pulses defined by an erase power Pe1 and an erase power Pe2 as an erasing pulse for forming a space part between mark parts, updating a set value of a duty ratio Te1 of a pulse width of the erase power Pe1 with respect to a cycle of the multiple pulses at predetermined intervals in accordance with the recording linear velocity, and wherein the step of updating comprises the steps of:

updating set values of the erase power Pe1 and the erase power Pe2 at predetermined intervals in accordance with the recording linear velocity;

detecting index values which are pre-formatted on the optical disk medium of a plurality of the recording linear velocities, the erase powers Pe1 and the erase powers Pe2 corresponding to the recording linear velocities, and duty ratios Te1 of a pulse width of the erasing pulse corresponding to the recording linear velocities;

calculating variations in the set values of the erase power Pe1, the erase power Pe2, and the duty ratio Te1 that are updated at the predetermined intervals based on the detected index values; and setting the erase power Pe1 and the erase power Pe2 with respect to the desired recording linear velocity.

7. An information recording method of performing recording on an optical disk medium having a recording layer on which mark information is recorded by a laser beam emitted in accordance with a waveform based on a recording pulse sequence, said information recording method comprising the steps of:

performing recording while varying a recording clock cycle T in accordance with a variation in a recording linear velocity such that a recording linear density becomes substantially constant; and when performing recording by using multiple pulses defined by an erase power Pe1 and an erase power Pe2 as an erasing pulse for forming a space part between mark parts, updating set values of the erase power Pe1 and Pe2 and a set value of a duty ratio Te1 of a pulse width of the erase power Pe1 with respect to a cycle of the multiple pulses at predetermined intervals in accordance with the recording linear velocity, and wherein the step of updating comprises the steps of:

updating a set value of a duty ratio Te1 of a pulse width of the erase power Pe1 at predetermined intervals in accordance with the recording linear velocity;

detecting address information that is pre-formatted on the optical disk medium;

calculating the set values of the erase power Pe1, the erase power Pe2, and a duty ratio Te1 of a pulse width of the erasing pulse with respect to the address information corresponding to the recording linear velocity from variations in the set values that are updated at predetermined intervals; and calculating the set values of the erase power Pe1, the erase power Pe2, and the duty ratio Te1 with respect to desired address information by associating the predetermined intervals with corresponding ranges of the address information.

\* \* \* \* \*